UNITED STATES PATENT OFFICE.

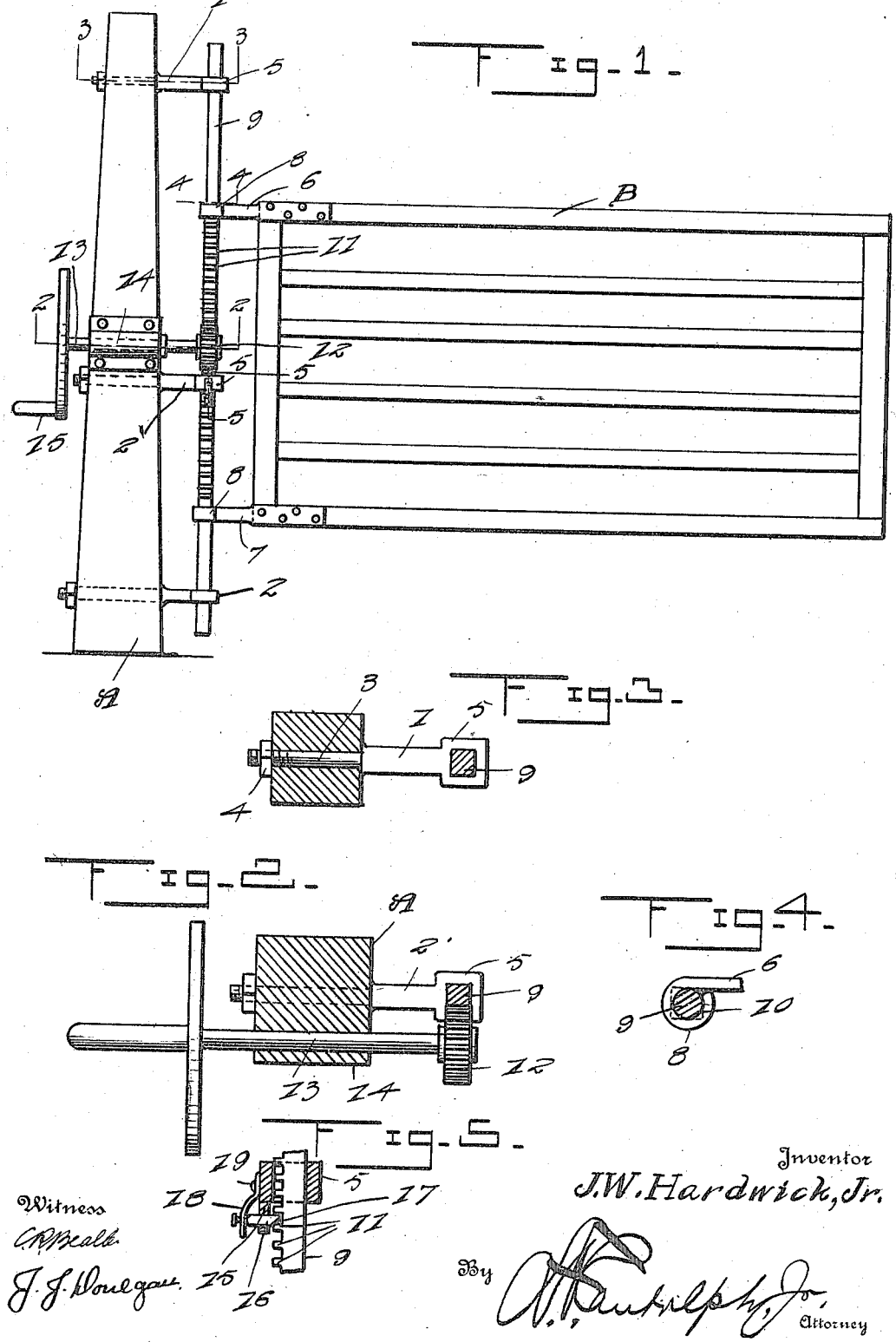

JAMES W. HARDWICK, JR., OF HUMBIRD, WISCONSIN.

GATE-RAISER.

1,233,225.  Specification of Letters Patent.  Patented July 10, 1917.

Application filed September 20, 1916. Serial No. 121,182.

*To all whom it may concern:*

Be it known that I, JAMES W. HARDWICK, Jr., a citizen of the United States, residing at Humbird, in the county of Clark and State of Wisconsin, have invented certain new and useful Improvements in Gate-Raisers; and I do hereby declare the following to be a full, clear, and exact description of the invention, such as will enable others skilled in the art to which is appertains to make and use the same.

This invention relates to combined horizontally swinging and vertically movable gates, an object of the invention being the provision of simple, durable and efficient mechanism for connecting the gate to a gate post, and which will admit of the manual operation of the gate either in a horizontal or vertical direction being easily performed.

Other objects will appear and be better understood from that embodiment of my invention of which the following is a specification, reference being had to the accompanying drawing forming a part thereof, in which:

Figure 1 is a side elevation of a gate, showing the manner of mounting the same on the post, Fig. 2 is a section taken on the line 2—2 of Fig. 1, Fig. 3 is a detail sectional view, taken on the line 3—3 of Fig. 1, Fig. 4 is a section, taken on the line 4—4 of Fig. 1, and Fig. 5 is a vertical detail sectional view, taken on the line 5—5 of Fig. 1.

Referring to the drawing in detail, the letter A designates a gate post and B a gate. Associated with the gate post A is an upper bracket arm 1 and a lower bracket arm 2, and an intermediate bracket arm 2'. Each of these bracket arms has one end rounded, as at 3, and extended through an opening in the gate post, and has the free terminal of the rounded end threaded for the reception of a nut 4, which is adjustable against the outer side of the gate post, so as to hold the bracket arm in position. The inner end of each of the bracket arms is enlarged, as shown at 5, and provided with a rectangular shaped opening, and the openings in the enlarged portions 5 of the bracket arms 1 and 2 aline.

The gate B has its inner end provided with arms 6 and 7, each of which has one end secured to the gate and its opposite end free and projected a distance beyond the inner end of the gate. The free end of the upper bracket arm 6 is located between the bracket arms 1 and 2' carried by the post A, and the lower arm 7 has its free end disposed between the bracket arms 2 and 2', as shown in Fig. 1 of the drawing. The free ends of the arms 6 and 7, are enlarged as shown at 8, and provided with eyes that register with the openings in the enlarged portions 5 of the bracket arms 1 and 2 and 2'. A bar 9 extends through the openings in the enlarged portions 5 of the bracket arms 1 and 2, and through the eyes 8 on the arms 6 and 7 carried by the gate, and the said bar is of rectangular shape in cross section and is provided at points spaced from the bracket arms 1 and 2 and 2', with grooves 10, which receive the eyes on the arms 6 and 7 so as to admit of the gate B having horizontal swinging movement on the rod 9. The rod 9 is slidably received by the openings in the enlarged portions 5 on the bracket arms 1 and 2 and 2', so as to admit of the rod having vertical sliding movement to admit of the gate being raised, when desired. That portion of the rod 9 that is interposed between the arms 6 and 7, carried by the gate, is provided on one side with a plurality of rack teeth 11. These rack teeth 11 are adapted to be interchangeably engaged by a pinion 12 carried by the inner end of a shaft 13. The shaft 13 is journaled in a bearing plate 14 mounted on one side of the post A, and the outer end of the shaft 13 is provided with a manipulating wheel 15. When the shaft 13 is rotated the pinion 12 will impart sliding movement to the rod 9, so as to effect either a raising or lowering of the gate, depending upon which direction the shaft 13 is rotated.

The enlarged portion 5 on the bracket arm 2', carried by the post A, is provided with a depending lug 15, that is arranged in opposed and spaced relation with the rack teeth 11 formed on the rod 9. This lug 15 is provided, adjacent its lower end, with an opening through which is slidably mounted a pawl 16, the inner end of the pawl 16 having a beveled lower face 17. The outer end of the pawl 16 is restricted and extended through an opening formed in the free end of a leaf spring 18, the opposite end of the leaf spring 18 being connected to the side of the enlarged portion 5 on the bracket arm 2' by means of a fastening element 19. During the upward movement of the rod 9, the teeth 11 will engage the beveled end 17 of the pawl 16, and move the pawl outwardly so as to admit of the vertical movement of the rod 9.

When the rod 9 is stationary, the inner end of the pawl 15 extends into the space between certain adjacent teeth, and the upper surface of the pawl engages against the under side of the upper adjacent tooth and forms a stop to prevent downward movement of the rod 9. When it is desired to lower the gate, the pawl 16 is pulled outwardly, from engagement with the teeth 11, so as to admit of the rod 9 moving downwardly.

It is evident that various changes might be resorted to in the construction, form and arrangement of the several parts without departing from the spirit and scope of the invention: hence, I do not wish to limit myself strictly to the structure herein described and claimed.

Having thus described my invention what I claim as new, is:

The combination with a gate and a gate post, of bracket arms carried by the gate post and provided with alined openings, a rod slidably received by the openings in the bracket arms and having one side provided with rack teeth, arms carried by the gate and arranged in alternate relation with the bracket arms on the post and lying, respectively, above and below the teeth on the rod and journaled for horizontal swinging movement on the rod so as to admit of horizontal swinging movement of the gate, a shaft journaled on the gate post, a pinion carried by the shaft and meshing with the rack teeth on the rod so as to effect sliding movement of the rod when the shaft is rotated, and means carried by one of the bracket arms and adapted to interchangeably engage the teeth on the rod so as to hold the rod in different adjusted positions.

In testimony whereof I affix my signature in presence of two witnesses.

JAMES W. HARDWICK, Jr.

Witnesses:
WM. G. HARDWICK,
EDWIN PIERCE.

Copies of this patent may be obtained for five cents each, by addressing the "Commissioner of Patents, Washington, D. C."